(12) United States Patent
Sakai et al.

(10) Patent No.: US 7,216,894 B2
(45) Date of Patent: May 15, 2007

(54) OCCUPANT DETERMINATION DEVICE

(75) Inventors: Morio Sakai, Toyota (JP); Norihiko Nagae, Seto (JP); Daisuke Itoh, Kasugai (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 422 days.

(21) Appl. No.: 10/724,049

(22) Filed: Dec. 1, 2003

(65) Prior Publication Data

US 2004/0159485 A1 Aug. 19, 2004

(30) Foreign Application Priority Data

Nov. 29, 2002 (JP) ............... 2002-348376

(51) Int. Cl.
*B60R 21/16* (2006.01)
(52) U.S. Cl. .................................... 280/735
(58) Field of Classification Search ........... 280/735; 180/273, 271
See application file for complete search history.

(56) References Cited

U.S. PATENT DOCUMENTS

| 4,950,914 | A | * | 8/1990 | Kurihara et al. ........... 307/10.1 |
| 5,428,340 | A | * | 6/1995 | Kawabata et al. .......... 340/438 |
| 6,259,167 | B1 | * | 7/2001 | Norton ...................... 307/10.1 |
| 6,364,352 | B1 | * | 4/2002 | Norton ....................... 280/735 |
| 6,727,823 | B2 | * | 4/2004 | Ando et al. ................ 340/666 |
| 6,774,804 | B2 | * | 8/2004 | Sakai et al. ................ 340/665 |
| 6,808,201 | B2 | * | 10/2004 | Aoki .......................... 280/735 |
| 2004/0024508 | A1 | * | 2/2004 | Sakai et al. .................... 701/45 |
| 2005/0096818 | A1 | * | 5/2005 | Fukuda et al. ................ 701/45 |

FOREIGN PATENT DOCUMENTS

| JP | 9-207638 A | 8/1997 |
| JP | 10-194076 A | 7/1998 |
| JP | 10-194078 A | 7/1998 |
| JP | 2001-187541 A | 7/2001 |
| JP | 2002-178813 A | 6/2002 |

* cited by examiner

*Primary Examiner*—Paul N. Dickson
*Assistant Examiner*—Barry Gooden, Jr.
(74) *Attorney, Agent, or Firm*—Buchanan Ingersoll & Rooney PC

(57) ABSTRACT

An occupant determination device for a vehicle seat includes a load sensor provided at a seat body, a controller for calculating a detection load value based on a load value output from the load sensor and for determining an occupant sitting on the vehicle seat by comparing the detection load value and a predetermined threshold value, a determining means for determining whether or not a child restraint system is equipped on the vehicle seat based on a variation of the detection load value and a detecting means for detecting whether or not the vehicle is stopped. When a vehicle stop condition is not detected by the detecting means, the determining means does not determine whether or not the child restraint system is equipped on the seat.

19 Claims, 4 Drawing Sheets

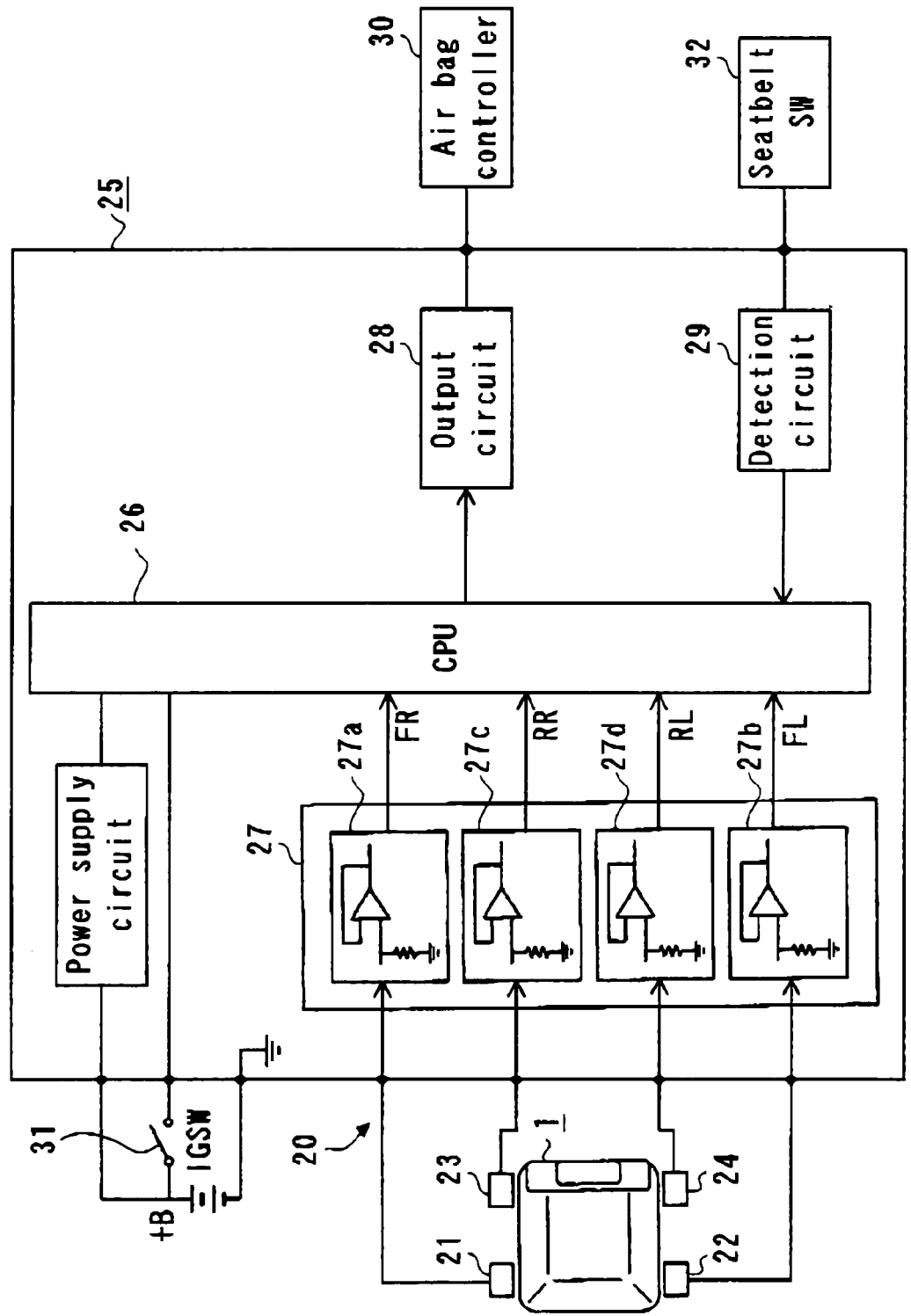

OCCUPANT DETERMINATION DEVICE

This application is based on and claims priority under 35 U.S.C. § 119 with respect to Japanese Application No. 2002-348376 filed on Nov. 29, 2002, the entire contents of which are incorporated herein by reference.

FIELD OF THE INVENTION

This invention generally relates to an occupant determination device for a vehicle seat. More particularly, this invention pertains to an occupant determination device for a vehicle seat operated based on a load value output from a load sensor that is provided on the vehicle seat.

BACKGROUND OF THE INVENTION

In case where an air bag is provided for protecting an occupant sitting on a vehicle seat, an occupant determination device is provided at the vehicle seat for determining whether an occupant is seated or not on the corresponding seat, the occupant is an adult or a child, or the like. Japanese Patent Laid-open Publication No. 09-207638 discloses a known occupant determination device. The disclosed device includes a plurality of load sensors provided at a plurality of fixing positions respectively of a seat body facing a vehicle floor, and a controller for calculating a detection load value based on load values output from the plurality of load sensors and for determining whether or not an occupant is seated on the vehicle seat based on the calculated detection load value. More specifically, the controller calculates the detection load value by summing up the load values output from the plurality of load sensors using an adder, compares this detection load value with a load value set in advance (threshold value for determination) using a determination processing circuit, and determines whether or not an occupant is seated on the vehicle seat by comparing the detection load value and the threshold value for determination.

The vehicle seat on a passenger side may be equipped with a child restraint system (hereinafter referred to as "CRS"). In process of installing the CRS on the seat, a large load in downward direction is added to the seat by tightening the CRS with the seatbelt. At this time, a load greater than the original CRS's is detected, thereby possibly causing a wrong determination that an adult is sitting on the seat.

In order to prevent a wrong determination that an adult is sitting on the seat when installing the CRS on the seat, the installation of the CRS on the seat is desired to be determined. In Japanese Patent Laid-Open Publication No. 10-194076, it is disclosed that a predetermined communication is possible between the vehicle seat and the CRS. That is, the installation of the CRS on the seat can be determined by the communication function between the vehicle seat and the CRS.

In addition, Japanese Patent Laid-Open Publication No. 2001-187541 discloses a CRS determination based on a distribution status of pressure applied to the vehicle seat. Further, Japanese Patent Laid-Open Publication No. 2002-178813 discloses a CRS determination using the aforementioned detection load value instead of structures disclosed in Japanese Patent Laid Open Publication No. 10-194076 or No. 2001-187541. That is, the CRS is determined based on a load variation (variation of the detection load value) occurring when installing the CRS on the vehicle seat.

When the CRS is determined based on the load variation occurring when installing the CRS on the seat, a wrong determination may occur due to the load variation caused by a vibration under the vehicle running and the like.

Thus, a need exists for an occupant determination device that can determine accurately whether or not a child restraint system is equipped on the vehicle seat.

SUMMARY OF THE INVENTION

According to an aspect of the present invention, an occupant determination device for a vehicle seat includes a load sensor provided at a seat body, and a controller for calculating a detection load value based on a load value output from the load sensor and for determining an occupant sitting on the vehicle seat by comparing the detection load value and a predetermined threshold value. The occupant determination device further includes a determining means for determining whether or not a child restraint system is equipped on the vehicle seat based on a variation of the detection load value, and a detecting means for detecting whether or not the vehicle is stopped. When a vehicle stop condition is not detected by the detecting means, the determining means does not determine whether or not the child restraint system is equipped on the seat.

According to another aspect of the present invention, an occupant determination device for a vehicle seat includes a plurality of load sensors provided at a seat body, and a controller for calculating a detection load value by summing up load values output from the plurality of load sensors and for determining an occupant sitting on the vehicle seat based on the detection load value. The occupant determination device further includes a determining means for determining whether or not a child restraint system is equipped on the vehicle seat based on a variation of the detection load value and a detecting means for detecting whether or not the vehicle is stopped. When a vehicle stop condition is not detected by the detecting means, the determining means does not determine whether or not the child restraint system is equipped on the seat.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

FIG. 4 is a block diagram of an electrical structure of the embodiment of the present invention;

DETAILED DESCRIPTION OF THE INVENTION

Figure 1:
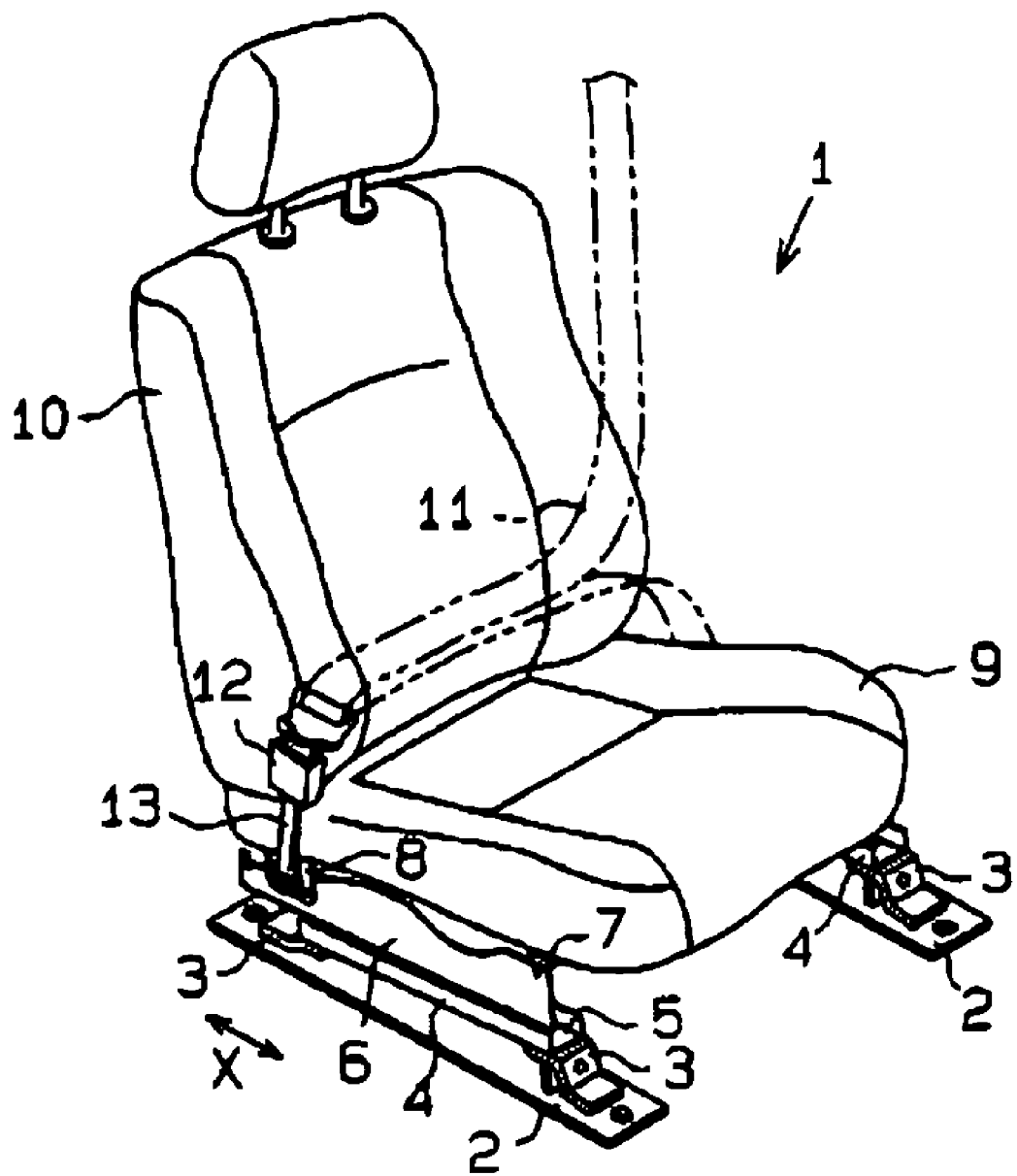
FIG. 1 is a perspective view of a vehicle seat according to an embodiment of the present invention.

An embodiment of the present invention is explained referring to FIGS. 1 to 5. FIG. 1 is a perspective view of a seat body 1 of a vehicle seat. The seat body 1 is provided on a passenger seat side of a vehicle. A pair of supporting frames 2 provided on right and left sides respectively in FIG. 1 are fixed on a vehicle floor (not shown) in a longitudinal direction of the vehicle (arrow X direction in FIG. 1).

Brackets 3 consisting of two pairs of brackets each provided on front and rear sides in FIG. 1 of the seat body 1 are fixed on an upper face of the respective supporting frames 2. A pair of lower rails 4 provided on right and left sides in FIG. 1 are fixed to the respective pairs of brackets 3 along the supporting frames 2. Each lower rail 4 obtains a U-shape in cross section, whose upper portion opens and extends in the longitudinal direction of the vehicle to thereby form a sliding groove 5.

Figure 2:
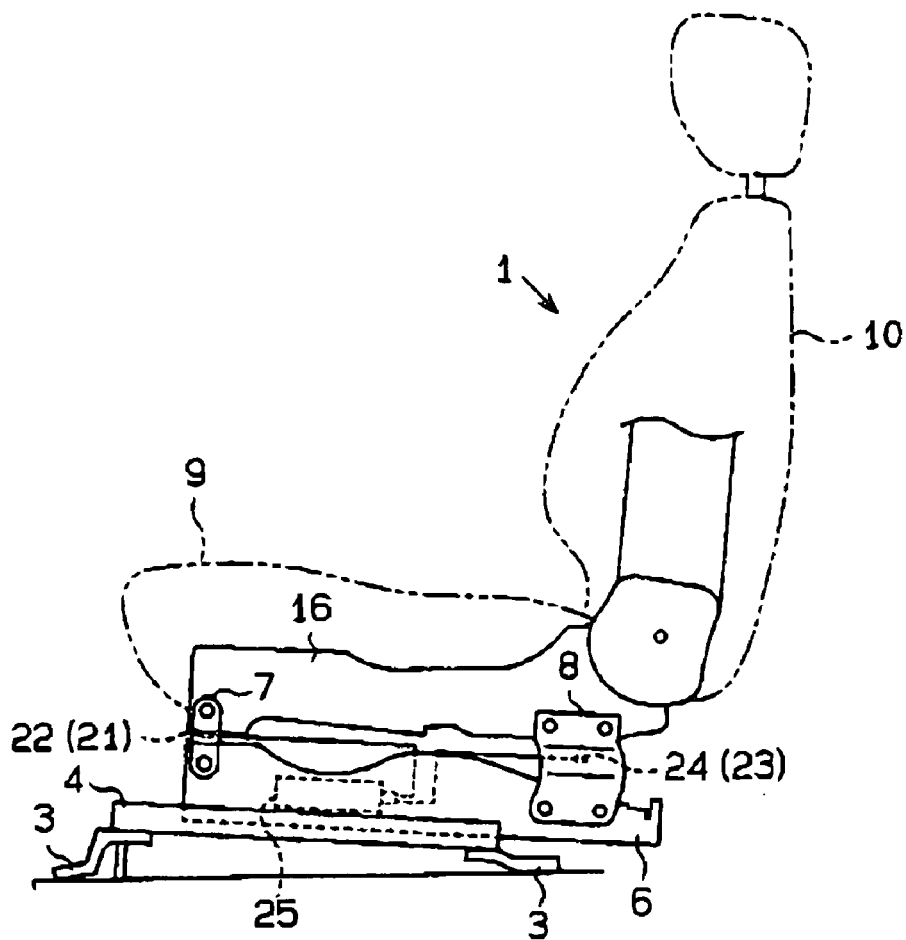
FIG. 2 is a side view of the vehicle seat according to the embodiment of the present invention.

A pair of upper rails 6 provided on right and left sides in FIG. 1 are slidable in the sliding grooves 5 formed at the respective lower rails 4. As shown in FIG. 2, each upper rail 6 is connected to each lower arm 16 that supports a seat cushion 9 and a seat back 10 of the seat body 1 with keeping a predetermined distance between the lower arm 16 and the upper rail 6 via one of a pair of front side sensor brackets 7 provided on right and left front sides in FIG. 1 and one of a pair of rear side sensor brackets 8 provided on right and left rear sides in FIG. 1.

Figure 3A:
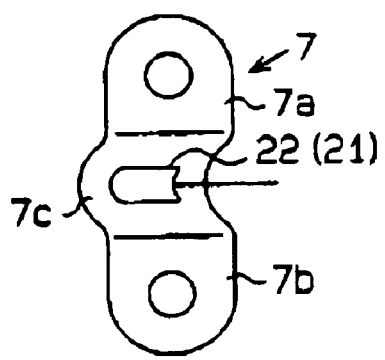
FIG. 3a is a front view of a sensor bracket provided on a front side of the vehicle seat.

As shown in FIG. 3a, each front side sensor bracket 7 includes an upper end portion 7a at an upper end side, a lower end portion 7b at a lower end side, and a bending portion 7c formed by bending a portion between the upper end portion 7a and the lower end portion 7b. The front side sensor bracket 7 is connected to the lower arm 16 via the upper end portion 7a and the front portion of the upper rail 6 via the lower end portion 7b. Then, a right front load sensor 21 and a left front load sensor 22 are attached to the respective bending portions 7c of the front side sensor brackets 7 on right and left side of the seat cushion 9. The right front load sensor 21 and the left front load sensor 22 each includes an element for detecting deformation such as a strain gauge and electrically detects a bending degree of the bending portion 7c bending in response to the load applied to the seat cushion 9.

Figure 3B:
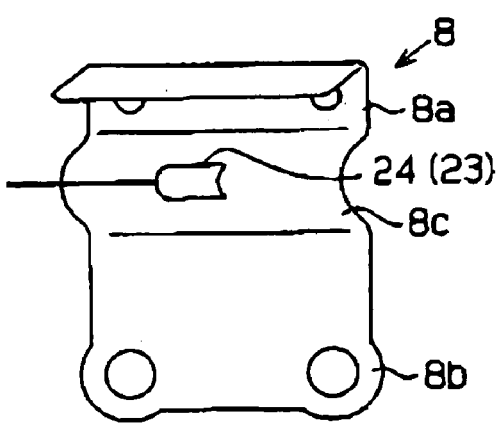
FIG. 3b is a front view of a sensor bracket provided on a rear side of the vehicle seat.

As shown in FIG. 3b, each rear side sensor bracket 8 includes an upper end portion 8a at an upper end side, a lower end portion 8b at a lower end side, and a bending portion 8c formed by bending a portion between the upper end portion 8a and the lower end portion 8b. The rear side sensor bracket 8 is connected to the lower arm 16 via the upper end portion 8a and the rear portion of the upper rail 6 via the lower end portion 8b. Then, a right rear load sensor 23 and a left rear load sensor 24 are attached to the respective bending portions 8c of the rear side sensor brackets 8 on right and left side of the seat cushion 9. In the same manner as the right front and left front load sensors 21 and 22, the right rear load sensor 23 and the left rear load sensor 24 each includes an element for detecting deformation such as a strain gauge and electrically detects a bending degree of the bending portion 8c bending in response to the load applied to the seat cushion 9.

An anchor bracket 13 of a belt anchor 12 to which a seatbelt 11 is to be connected is connected to one side of the upper rail 6 in FIG. 1. FIG. 4 is a block diagram showing an electrical structure of an occupant determination device 20 employed in the vehicle seat. The occupant determination device 20 according to the present embodiment includes the aforementioned load sensors 21 to 24, and a controller 25. An ignition switch 31 for the engine ignition is connected to the controller 25. In addition, a seatbelt switch 32, which is turned on when the seatbelt 11 is fastened to the belt anchor 12, is connected to the controller 25.

The controller 25 includes a central processing unit (hereinafter referred to as CPU) 26, a sensor signal input circuit 27, an output circuit 28, and a detection circuit 29. The sensor signal input circuit 27 includes active filters 27a, 27b, 27c, and 27d that are associated with the right front load sensor 21, the left front load sensor 22, the right rear load sensor 23 and the left rear load sensor 24, respectively. The load signal from the load sensors 21 to 24 is input to the CPU 26 via the active filters 27a to 27d. Each of the active filters 27a to 27d is a known low-pass filter, which is configured for example, by a combination of a passive element, which includes a capacitor and a resistor, and an active element, which includes an amplifier. The active filters 27a to 27d only pass low frequency signals and eliminate other signals among those generated by the load sensors 21 to 24.

In the CPU 26, output load values FR and FL are calculated based on the respective load signals from the right front load sensor 21 and the left front load sensor 22 that have passed through the active filters 27a and 27b respectively. In addition, output load values RR and RL are calculated based on the respective load signals from the right rear load sensor 23 and the left rear load sensor 24 that have passed through the active filters 27c and 27d respectively. Then, a detection load value Ws is calculated by summing up the output load values FR, FL, RR and RL.

The ignition switch 31 is connected to the CPU 26. Thus, the CPU 26 is at least able to detect a stop condition of the vehicle by receiving a signal (ON or OFF signal) from the ignition switch 31. This is because the vehicle never runs under the ignition switch 31 in OFF status.

Further, the seatbelt switch 32 is connected to the CPU 26 via the detection circuit 29. The CPU 26 is thus able to detect the fastening condition of the seatbelt 11 by receiving a signal (ON or OFF signal) from the seatbelt switch 32.

The CPU 26 performs various calculations according to a prestored control program, an initial data and the like. Then the CPU 26 outputs the calculated results, i.e. the results of the occupant determination, to the output circuit 28. The calculated results are output to an airbag controller 30, for example, via the output circuit 28, thereby controlling the operation of an airbag device.

Figure 5:
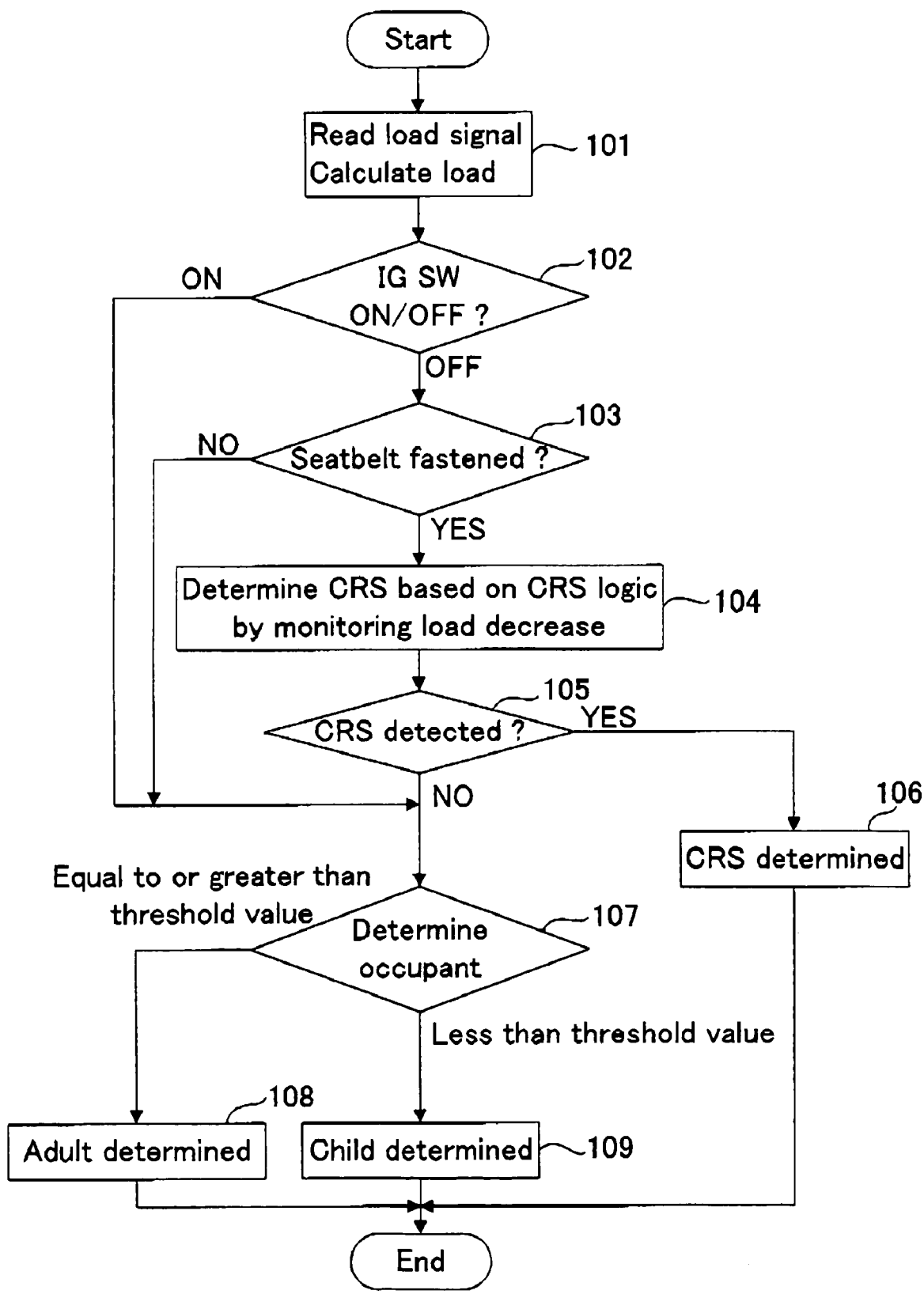
FIG. 5 is a flowchart of an occupant determination operation according to the embodiment of the present invention.

A process of the occupant determination according to the present embodiment is explained based on a flowchart in FIG. 5. This process is repeatedly performed in interrupts at predetermined time intervals.

When a routine of the flowchart is entered, the CPU 26 performs an input operation in Step 101. Specifically, the CPU 26 reads the load signal from the load sensors 21 to 24, which has been filtered in the sensor signal input circuit 27. Next, the CPU 26 calculates the detection load value Ws by summing up the output load values FR, FL, RR, and RL, which are calculated based on the respective load signals from the load sensors 21, 22, 23 and 24, and once stores that calculated detection load value Ws in a memory. Then the CPU 26 proceeds to Step 102.

In Step 102, the CPU 26 determines whether the ignition switch 31 is currently in ON or OFF status. If the ignition switch 31 is determined as OFF status, the CPU 26 concludes that the vehicle is in the stop condition (i.e. not running) and then proceeds to Step 103.

In Step 103, the CPU 26 determines whether or not the seatbelt 11 is currently fastened. Specifically, the CPU 26 determines the seatbelt 11 to be fastened when receiving the ON signal from the seatbelt switch 32. In the same way, the CPU 26 determines the seatbelt 11 to be unfastened when receiving the OFF signal from the seatbelt switch 32.

When it is determined that the seatbelt 11 is fastened, the CPU 26 proceeds to Step 104. In step 104, the CPU performs a CRS determination procedure, i.e. performs a procedure for determining whether or not the CRS is equipped on the seat, according to a known logic based on a variation of the detection load value Ws (load variation). For example, the CPU 26 performs the CRS determination procedure based on a degree of decrease of the present detection load value Ws relative to a maximum detection load value that has been detected after the seatbelt 11 is fastened. For this determination, normal characteristics of the load variation that occur in process of equipping the CRS on the seat are used.

The CPU 26 then proceeds to Step 105 to determine whether or not the CRS installation on the seat is presently detected from the result of the CRS determination procedure conducted in Step 104. When it is determined that the CRS installation is detected, the CPU 26 proceeds to Step 106 to determine that the CRS is installed on the seat and stores this determination result in the memory. The CPU 26 terminates the present routine.

Whereas, if it is determined that the ignition switch 31 is in ON status in Step 102, the seatbelt 11 is not fastened in Step 103, or the CRS is not detected to be equipped on the seat in Step 105, the CPU proceeds to Step 107.

In Step 107, the CPU 26 determines an occupant sitting on the seat body 1. When the detection load value Ws is equal to or greater than a predetermined threshold value for an adult determination, the CPU 26 proceeds to Step 108 to perform the adult determination. That is, the CPU 26 determines that the adult is sitting on the vehicle seat since the sufficient load value that can be considered to occur by the adult is detected. Then, the CPU 26 stores this determination result in the memory and terminates the present routine.

Meanwhile, when the detection load value Ws is smaller than the predetermined threshold value for the adult determination, the CPU 26 performs a child determination. That is, the CPU 26 determines that the child is sitting on the vehicle seat since the sufficient load value that can be considered to occur by the adult is not detected. The CPU 26 then stores this determination result in the memory and terminates the present routine.

The determination result in either Step 106, 108 or 109 is output to the airbag controller 30 via the output circuit 28, thereby controlling the operation of the airbag device.

According to the present embodiment as mentioned above, the determination whether or not the CRS is equipped on the seat is not performed unless the vehicle is detected to be in the stop condition (i.e. the ignition switch signal is in ON status). Generally, the process of equipping the CRS on the seat body 1 is conducted when the vehicle is stopped. Therefore, when the CRS determination is performed based on the variation of the detection load value Ws that occurs distinctively in process of equipping the CRS, it is desirable to conduct the CRS determination on the condition of the vehicle stop. The CRS is then prevented from being determined as equipped on the seat due to the load variation caused by the vibration and the like under the vehicle running condition, thereby accurately conducting the CRS determination.

According to the present embodiment, the vehicle stop condition is detected using an existing member (ignition switch 31). In addition, the determination whether or not the CRS is equipped is performed by a simple method using an existing sensor (load sensor).

The present embodiment is not limited to the above and can be modified as follows. The vehicle stop condition is detected based on the signal from the ignition switch 31 (ignition switch signal) according to the present embodiment. However, the vehicle stop condition may be detected based on a signal from a shift position switch that indicates an operating position of a shift lever (or selector lever). Precisely, the vehicle stop condition is detected when the signal represents a parking (P) position. In this case, the vehicle stop condition may be detected using an existing member (shift positions switch).

The vehicle stop condition may be detected based on a signal from a parking switch (parking switch signal) indicating an operating position of a parking brake lever (hand brake lever). In this case as well, the vehicle stop condition may be detected using an existing member (parking switch).

Further, the vehicle stop condition may be detected based on a signal from a courtesy switch (courtesy switch signal) indicating an opening/closing state of a door on the passenger side of the vehicle. Precisely, the vehicle stop condition is detected when a signal represents a door opening state. The courtesy switch is normally provided for turning on a room lamp in conjunction with an opening of the door. The vehicle stop condition may be detected using an existing member (courtesy switch) in this case.

Still further, the vehicle stop condition may be detected based on a vehicle speed pulse from a speed sensor (speedometer pulse) being output each time when an output shaft of a transmission (not shown) rotates by a predetermined angle. Specifically, the vehicle stop condition is detected when the vehicle speed pulse represents a lower vehicle speed than a predetermined speed, which is regarded as the vehicle stop. An existing member (speed sensor) may be used for detecting the vehicle stop condition in this case as well.

Still further, the vehicle stop condition may be detected by a combination of the ignition switch signal, the shift position signal, the parking switch signal, the courtesy switch signal and the vehicle speed pulse.

According to the present embodiment, the pair of load sensors 21 and 22 are provided on right and left-front sides of the seat body 1 and another pair of load sensors 23 and 24 are provided on right and left-rear sides of the seat body 1. However, a number and an arrangement of the load sensors may be modified. It is only required to arrange one or more load sensors at a predetermined position on the seat body 1 and to perform the occupant determination based on the detection load value from the load sensors.

Each shape of the sensor brackets 7 and 8 provided on front and rear sides of the seat body 1 may be modified as long as the sensor brackets 7 and 8 are surely bent in response to a seat weight (i.e. load applied to the seat).

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An occupant determination device for a vehicle seat comprising:
    a load sensor provided at a seat body;
    a controller for calculating a detection load value based on a load value output from the load sensor and for determining an occupant sitting on the vehicle seat by comparing the detection load value and a predetermined threshold value;

a determining means for determining whether or not a child restraint system is equipped on the vehicle seat based on a variation of the detection load value; and a detecting means for detecting whether or not the vehicle is stopped; wherein when the detecting means detects that the vehicle is stopped the determining means determines whether a child restraint system is equipped on the vehicle seat, and when the detecting means detects that the vehicle is not stopped the determining means does not determine whether a child restraint system is equipped on the vehicle seat.

2. An occupant determination device according to claim 1, wherein the detecting means detects the vehicle stop condition based on at least one of an ignition switch signal, a shift position signal, a parking switch signal, a courtesy switch signal, and a vehicle speed pulse.

3. An occupant determination device according to claim 2, wherein the determining means determines whether or not the child restraint system is equipped on the vehicle seat based on the variation of the detection load value from a maximum detection load value detected after a seatbelt is fastened.

4. An occupant determination device for a vehicle seat comprising:

a plurality of load sensors provided at a seat body, a controller for calculating a detection load value by summing up load values output from the plurality of load sensors and for determining an occupant sitting on the vehicle seat based on the detection load value;

a determining means for determining whether or not a child restraint system is equipped on the vehicle seat based on a variation of the detection load value; and a detecting means for detecting whether or not the vehicle is stopped; wherein when the detecting means detects that the vehicle is stopped the determining means determines whether a child restraint system is equipped on the vehicle seat, and when the detecting means detects that the vehicle is not stopped the determining means does not determine whether a child restraint system is equipped on the vehicle seat.

5. An occupant determination device according to claim 4, wherein the detecting means detects the vehicle stop condition based on at least one of an ignition switch signal, a shift position signal, a parking switch signal, a courtesy switch signal, and a vehicle speed pulse.

6. An occupant determination device according to claim 5, wherein the determining means determines whether or not the child restraint system is equipped on the vehicle seat based on the variation of the detection load value from a maximum detection load value detected after the seatbelt is fastened.

7. An occupant determination device according to claim 1, wherein the controller is connected to an ignition switch and a seatbelt switch.

8. An occupant determination device according to claim 7, wherein when the ignition switch is determined to be ON, or the seatbelt switch is determined to be not fastened, or the child restraint system is determined not to be equipped on the vehicle seat, it is determined whether an occupant sitting on the seat is an adult or a child.

9. An occupant determination device according to claim 8, wherein when the detection load value is equal to or greater than the predetermined threshold value, it is determined that the occupant sitting on the seat is an adult.

10. An occupant determination device according to claim 9, wherein when the detection load value is smaller than the predetermined threshold value, it is determined that the occupant sitting on the seat is a child.

11. An occupant determination device according to claim 4, wherein the controller is connected to an ignition switch and a seatbelt switch.

12. An occupant determination device according to claim 11, wherein when the ignition switch is determined to be ON, or the seatbelt switch is determined to be not fastened, or the child restraint system is determined not to be equipped on the vehicle seat, it is determined whether an occupant sitting on the seat is an adult or a child.

13. An occupant determination device according to claim 12, wherein when the detection load value is equal to or greater than the predetermined threshold value, it is determined that the occupant sitting on the seat is an adult.

14. An occupant determination device according to claim 13, wherein when the detection load value is smaller than the predetermined threshold value, it is determined that the occupant sitting on the seat is a child.

15. An occupant determination device according to claim 1, the detecting means detects whether or not the vehicle is stopped based on a status of an ignition switch.

16. An occupant determination device according to claim 4, the detecting means detects whether or not the vehicle is stopped based on a status of an ignition switch.

17. An occupant determination device for a vehicle seat comprising:

a plurality of load sensors provided at a seat body;

a controller for calculating a detection load value by summing up load value outputs from the plurality of load sensors and for determining an occupant sitting on the vehicle seat based on a variation of the detection load value;

a determining means for determining whether or not a child restraint system is equipped on the vehicle seat based on a variation of the detection load value;

a detecting means for detecting a vehicle stop condition based on a status of an ignition switch; and a seatbelt switch for detecting whether or not a seatbelt is fastened, wherein when the detecting means detects the vehicle stop condition and the seatbelt switch detects that the seatbelt is fastened, the determining means determines whether a child restraint system is equipped on the seat, and when the detecting means detects that the vehicle is not stopped the determining means does not determine whether a child restraint system is eguipped on the vehicle seat.

18. An occupant determination device according to claim 17, wherein when the detecting means determines that the vehicle is not stopped or the seatbelt switch detects that the seatbelt is not fastened, it is determined whether an occupant sitting on the seat is an adult or a child.

19. An occupant determination device according to claim 17, wherein when the detecting means detects the vehicle stop condition, the seatbelt switch detects that the seatbelt is fastened and the determining means determines that the child restraint system is not equipped on the vehicle seat, it is determined whether an occupant sitting on the seat is an adult or a child.

* * * * *